United States Patent
Gaid et al.

(10) Patent No.: US 10,486,987 B2
(45) Date of Patent: Nov. 26, 2019

(54) MEMBRANE WATER TREATMENT FACILITY AND METHOD INCORPORATING ADSORPTION ON AN ADSORBENT POWDERED MATERIAL AND MEANS FOR LIMITING THE ABRASION OF THE MEMBRANES

(71) Applicant: Veolia Water Solutions & Technologies Support, Saint-Maurice (FR)

(72) Inventors: Abdelkader Gaid, Paris (FR); Annie Tazi-Pain, Asnieres-sur-Seine (FR); Catherine Daines-Martinez, Andresy (FR)

(73) Assignee: Veolia Water Solutions & Technologies Support, Saint-Maurice (FR)

( * ) Notice: Subject to any disclaimer, the term of this patent is extended or adjusted under 35 U.S.C. 154(b) by 455 days.

(21) Appl. No.: 15/105,221

(22) PCT Filed: Dec. 11, 2014

(86) PCT No.: PCT/EP2014/077417
§ 371 (c)(1),
(2) Date: Jun. 16, 2016

(87) PCT Pub. No.: WO2015/091211
PCT Pub. Date: Jun. 25, 2015

(65) Prior Publication Data
US 2016/0318777 A1    Nov. 3, 2016

(30) Foreign Application Priority Data
Dec. 20, 2013 (FR) .................. 13 63233

(51) Int. Cl.
*B01D 15/02* (2006.01)
*C02F 1/44* (2006.01)
(Continued)

(52) U.S. Cl.
CPC ............ *C02F 1/444* (2013.01); *B01D 61/027* (2013.01); *B01D 61/14* (2013.01); *B01D 61/145* (2013.01);
(Continued)

(58) Field of Classification Search
CPC    B01D 15/02; B01D 21/0012; B01D 21/0003; B01D 21/0039; B01D 24/28;
(Continued)

(56) References Cited

U.S. PATENT DOCUMENTS 5,932,099 A  *  8/1999  Cote ..................... B01D 61/18
                                                210/151
2003/0132160 A1   7/2003  Khudenko
(Continued)

FOREIGN PATENT DOCUMENTS

CA    2199517    2/1997
FR    2737202 A1    1/1997
(Continued)

OTHER PUBLICATIONS

Pradhan, M. et al., "Combined effect of air and mechanical scouring of membranes for fouling reduction in submerged membrane reactor", Journal Article, Desalination 288, Jan. 1, 2012, pp. 58-65, Elsevier.
(Continued)

*Primary Examiner* — Allison G Fitzsimmons
(74) *Attorney, Agent, or Firm* — Coats & Bennett, PLLC (57) ABSTRACT

Method for treating water comprising: a step for putting said water into contact with an adsorbent powdery material in a concentration of 0.1 to 5 g/L in a membrane reactor con-
(Continued)

taining at least one submerged filtration membrane; a step of filtration by submerged membrane of said water containing said adsorbent powdery material in said membrane reactor, said membrane being at least partly constituted by an organic material; characterized in that it includes steps aimed at limiting the abrasion of said at least one submerged membrane by said adsorbent powdery material, said steps consisting in: putting said water containing said adsorbent powdery material into contact, in said membrane reactor, with a particulate polymer material constituted by particles in a concentration of 1 g/L to 10 g/L, said particles having an average diameter of 1 mm to 5 mm and a density of 1.05 to 1.5; and stirring said mixture constituted by water, adsorbent powdery material and particulate polymer material within said membrane reactor containing said at least one filtration membrane.

7 Claims, 3 Drawing Sheets (51) Int. Cl.
| C02F 1/78 | (2006.01) |
| B01D 61/14 | (2006.01) |
| C02F 3/12 | (2006.01) |
| B01D 61/02 | (2006.01) |
| C02F 1/28 | (2006.01) |
| B01D 61/00 | (2006.01) |
| C02F 101/30 | (2006.01) |
| C02F 103/34 | (2006.01) |
| C02F 3/28 | (2006.01) |

(52) U.S. Cl.
CPC ............ *B01D 61/147* (2013.01); *C02F 1/283* (2013.01); *C02F 1/442* (2013.01); *C02F 1/78* (2013.01); *C02F 3/1226* (2013.01); *C02F 3/1273* (2013.01); *B01D 2311/25* (2013.01); *B01D 2311/2626* (2013.01); *B01D 2311/2634* (2013.01); *B01D 2311/2688* (2013.01); *B01D 2315/06* (2013.01); *B01D 2321/2091* (2013.01); *C02F 3/1263* (2013.01); *C02F 3/2853* (2013.01); *C02F 2101/30* (2013.01); *C02F 2101/305* (2013.01); *C02F 2101/306* (2013.01); *C02F 2103/343* (2013.01); *C02F 2303/16* (2013.01); *Y02W 10/15* (2015.05)

(58) Field of Classification Search
CPC ........ B01D 24/00; B01D 37/00; B01D 61/00; B01D 61/14; B01D 61/145; B01D 61/147; B01D 61/16; B01D 61/18; B01D 61/20; B01D 61/22; B01D 2315/05; B01D 2321/10
USPC ................................ 210/630, 631, 620, 616
See application file for complete search history.

(56) References Cited

U.S. PATENT DOCUMENTS

| 2011/0042308 A1* | 2/2011 | Krause ................. B01D 65/02 210/615 |
| 2011/0210065 A1 | 9/2011 | Thouvenot |
| 2011/0247978 A1 | 10/2011 | Conner |

FOREIGN PATENT DOCUMENTS

| FR | 2924111 A1 | 5/2009 |
| FR | 2938252 A1 | 5/2010 |
| JP | 63214177 A | 9/1988 |
| JP | 06047399 A | 2/1994 |
| JP | 07328624 A | 12/1995 |
| JP | 2001062477 A | 3/2001 |
| JP | 2001062488 A | 3/2001 |
| JP | 2002361053 A | 12/2002 |
| JP | 2012166142 A | 9/2012 |
| WO | 2013064667 A1 | 5/2013 |

OTHER PUBLICATIONS

English Translation of the International Search Report for PCT/EP2014/077417 dated Mar. 11, 2015.

Pradhan, M., et al., "Combined effect of air and mechanical scouring of membranes for fouling reduction in submerged membrane reactor", Desalination, vol. 288, Mar. 1, 2012 (Mar. 1, 2012), pp. 58-65.

Krause, S., et al., "Enhanced membrane bioreactor process without chemical cleaning", Water Science and Technology, vol. 61, No. 10, (2010), pp. 2575-2580.

Rosenberger, S., et al., "Principles of an enhanced MBR-process with mechanical cleaning", Water Science and Technology, vol. 64, No. 10 (2011), pp. 1951-1958.

* cited by examiner

MEMBRANE WATER TREATMENT FACILITY AND METHOD INCORPORATING ADSORPTION ON AN ADSORBENT POWDERED MATERIAL AND MEANS FOR LIMITING THE ABRASION OF THE MEMBRANES

This application is a U.S. National Stage of PCT Application No. PCT/EP2014/077417, with an international filing date of 11 Dec. 2014. Applicant claims priority based on French Patent Application Nos. 1363233 filed 20 Dec. 2013. The subject matter of these applications is incorporated herein.

1. FIELD OF THE INVENTION

The field of the invention is that of the treatment of water.

More specifically, the invention relates to methods and corresponding plants for treating water aimed at reducing its content in pollutants, implementing at least one membrane reactor.

The term "pollutant" in the following description is understood to mean any substance present in water to be treated, the content of which needs to be restricted in order to make said water to be treated suited to a given use, including human or animal consumption. Such substances include microorganisms, suspended matter, organic matter, colloidal matter, pesticides and/or fertilizers, medicinal residues, solvents, endocrine disruptors, etc.

2. PRIOR ART

Various methods are implemented on treated or natural water in order to cleanse it or make it drinkable. The purpose of these methods is to rid the water of all or part of the organic matter, micropollutants, microorganisms, suspended matter . . . that they contain. The micropollutants found in water can be of various origins: medicinal residues, endocrine disruptors, pesticide residues, chlorinated solvents etc.

Such steps classically implement a step of coagulation-flocculation followed by a step of adsorption in which the water to be treated is put into contact with an absorbent powdery material such as powdered activated carbon (PAC), ion-exchanging resins or zeolites. Through their porosity and high capacity of absorption, the adsorbent powdery materials enable the fixing or adsorption of the pollutant. These powdery materials and the coagulation-flocculation reagents are then separated from the water, generally by means of a gravity separator and then by a sand filter and finally by filtration membranes. The steps of coagulation-flocculation and adsorption considerably reduce the pollution contained in the water. Thus, water reaching the filtration membranes is already rid of numerous substances that could clog the membranes. However, these methods, in order to be implemented, require an infrastructure, especially civil engineering works that are substantial and therefore costly. In addition, such methods imply the need to finely control the conditions of implementation, especially as regards the concentrations of powdery material in the separator and the management of the losses of this material flowing at the bottom of the separator in order to minimize the quantities of fresh material that must be added to minimize these losses. All these factors have a negative impact on the overall efficiency of such water treatment plants and on the cost of production of treated water.

These drawbacks are to a great extent overcome by the technique of treating waste or natural water in order to eliminate its content in dissolved organic pollutants described in the patent application number FR-A1-2982255, in which water is put into contact with PAC in a reactor in which it flows at a speed of 5 to 50 m/h, and then the mixture obtained is directly filtered through a non-membrane mechanical filtration unit.

In other alternative methods, the water to be treated is put into contact with PAC and then the treated water is separated from the PAC by membrane filtration in an external-internal filtration. The membranes used in this context can especially be a nanofiltration membranes or ultrafiltration membranes or microfiltration membranes. The PAC is then recovered and recycled upstream to the filtration membranes.

Such methods prove to be particularly efficient. However, they can be further improved.

During filtration by submerged membranes by microfiltration or by ultrafiltration or by nanofiltration, during which the water is drawn through the membranes, the powdery material such as the PAC clogs the pores of these membranes. The membranes thus tend to get gradually clogged, leading to an increase in the load loss and a reduction of the filtration flow through the membranes, and therefore an increase in energy consumption. The clogging of the membranes by the PAC, which can be partly irreversible, also tends to reduce the service life of the membranes.

The de-clogging of the submerged membranes requires the use of daily or weekly washes, using mainly chemical products such as chlorinated solvents. Now, these solvents reduce the adsorption capacity of the PAC. To overcome this reduction in the efficiency of the PAC, it is necessary to frequently inject fresh PAC into the water to be treated.

Air is often injected into the reactor to take part in the de-clogging of the membranes. This injected air can also stir the content of the reactor.

However, the PAC, combined with the injection of air into the filtration membranes and/or the chemical products used for the de-clogging, tends to have an abrasive action on the surface of the membranes. These membranes are indeed entirely or partly constituted by organic materials, chiefly polymers, having hardness lower than that of the PAC. This first consequence of this abrasion phenomenon is that it reduces the service life of the microfiltration or ultrafiltration membranes or nanofiltration membranes and as a corollary reduces the efficiency of the filtration.

It is therefore necessary to often replace the filtration membranes. In certain cases, this replacement of the membranes must take place annually.

These methods therefore cause major consumption of energy and reagents. In addition, the filtration membranes need to be replaced fairly frequently. This means that the working of the plant has to be stopped. All this plays a role in increasing the cost of production of the treated water.

3. GOALS OF THE INVENTION

The invention is aimed especially at overcoming all or part of these drawbacks of the prior art.

More specifically, it is a goal of the invention, in at least one embodiment, to propose a method for treating water combining adsorption on adsorbent powdery material such as especially powdered activated carbon and a membrane filtration, especially on a nanofiltration or microfiltration or ultrafiltration membrane constituted at least partly by an organic material that optimizes the service life of these membranes.

In particular, it is a goal of the invention to provide a method for the membrane treatment of water making it possible to limit the wear and tear of such filtration membranes through abrasion of the material that constitutes them.

It is an also goal of the invention, in at least one embodiment, to implement such a method for reducing the consumption in reagents needed for the de-clogging of the membranes and more generally the consumption of reagents implemented to carry out the treatment of water.

It is another goal of the invention to provide a technique which, in at least one embodiment, is simple in its design and/or simple to implement and/or compact and/or economical.

4. SUMMARY OF THE INVENTION

These goals as well as others that shall appear here below are attained by means of the invention which pertains to a method for treating water comprising:
a step for putting said water into contact with an adsorbent powdery material in a concentration of 0.1 to 5 g/L in a membrane reactor containing at least one submerged filtration membrane;
a step of filtration by submerged membrane of said water containing said adsorbent powdery material in said membrane reactor, said membrane being at least partly constituted by an organic material;
characterized in that it includes steps aimed at limiting the abrasion of said at least one submerged membrane by said adsorbent powdery material, said steps consisting in:
putting said water containing said adsorbent powdery material into contact, in said membrane reactor, with a particulate polymer material constituted by particles in a concentration of 1 g/L to 10 g/L, said particles having an average diameter of 1 mm to 5 mm and a density of 1.05 to 1.5; and,
stirring said mixture constituted by water, adsorbent powdery material and particulate polymer material within said membrane reactor containing said at least one filtration membrane.

The invention therefore proposes a technique for treating water combining adsorption on powdery material followed by filtration on a membrane including a step for providing a specific particulate polymer material in the water treatment reactor within which a stirring is generated and the aim of resolving the technical problem stemming from the abrasive capacity of the adsorbent powdery material on the organic material constituting, at least partly, the filtration membranes.

It will be noted that the invention is not limited to the case where the adsorbent powdery material is PAC but also covers the case where this adsorbent powdery material is another material such as for example a zeolite, provided that this material has a hardness greater than that of the organic material at least partly constituting the filtration membranes implemented. The invention will also find application when the adsorbent material is constituted by a resin, in as much as resin fines can have such an abrasive capacity.

Those skilled in the art were inclined to believe quite logically that the addition of a particulate material in the reactor containing the filtration membranes would, under the effect of the stirring motion that prevailed therein, accentuate the phenomenon of abrasion of said membranes and/or the phenomenon of clogging of these membranes. However, the inventors have noticed that the addition of a particulate polymer material does not in any way amplify the phenomenon of abrasion. Quite to the contrary, the particulate polymer material protects the surface of the membranes from mechanical wear and tear classically brought about by the adsorbent powdery material. More specifically, the inventors have noted that the protective role of the particulate polymer material relates to the fact that the particles composing the material as well as the turbulence induced by these particles form a protective shield around the filtration membranes or membranes. This protective shield prevents:
the adsorbent powdery material from getting bonded to the surface of the membranes and thus prevents or at least limits the clogging of the pores of the membranes, and
the adsorbent powdery material from a rubbing against the surface of the filtration membranes and thus prevents or at least limits the phenomenon of abrasion of the membranes.

The technique according to the invention thus reduces the frequency of the washes using chemical products on the membranes with a view to their de-clogging.

The negative impact of such chemical products on the adsorption capacity of the adsorbent powdery material is thus reduced, inducing a reduction of the consumption of this material.

The stirring within the reactor furthermore enables the creation in this reactor of a medium suited to the putting of the adsorbent powdery material and the particulate polymer material in suspension in such a way that their concentrations therein are at every point essentially homogenous. This plays a role in optimizing the treatment of the water.

In addition, the particulate polymer material in suspension in the reactor induces additional turbulence in the reactor. This additional turbulence plays a role in further homogenizing the concentration of adsorbent material in the reactor. Consequently, the efficiency of the water treatment is more regular, and the quality of the water treated is more reproducible.

For all these reasons, the method according to the invention makes it possible to achieve substantial savings in the membranes, in the use of the adsorbent powdery material, in the use of de-clogging chemical products and also major savings in terms of energy while at the same time producing a water of equally good quality or even of better quality than with the presently used methods.

The technique according to the invention especially lengthens the service life of the membranes. The frequency of replacement of the filtration membranes is thus reduced as compared with present-day techniques.

According to one variant, said stirring of said mixture constituted by water, particulate polymer material and adsorbent powdery material within said membrane reactor at least partly results from the preferably sequenced injection of air into said mixture. The advantage of sequencing the injection of air is that it causes turbulence by transitional modes and thus saves energy.

As an alternative or as a complement, said stirring of said mixture constituted by water, particulate polymer material and adsorbent powdery material within said membrane reactor at least partly results from a recirculation of at least one part of said mixture constituted by water and adsorbent powdery material in said reactor.

The stirring thus prompted firstly improves the homogeneity of the concentration of adsorbent powdery material and particulate polymer material in the reactor and secondly fosters the protective role of the particulate polymer material relative to the adsorbent powdery material.

Preferably, the adsorbent powdery material is powdered activated carbon (PAC), i.e. activated carbon constituted by particles having a mean diameter of 5 μm to 200 μm and preferably 15 μm to 35 μm.

Advantageously, said polymer material is chosen from the group comprising polypropylene beads, carbonated polypropylene beads, hollow polypropylene beads filled with minerals, polycarbonate beads, polyurethane beads, polymethylmethacrylate beads, polybutylene terephthalate beads, polyoxymethylene beads, polyethylene beads, and polyvinyl chloride beads.

These beads have the advantage of being chemically inert as compared with the membranes and cost little. The surface of these beads is preferably smooth so as not to act abrasively on the membranes or act as supports for fixing the biomass that the water to be treated could contain.

In one advantageous embodiment, said water to be treated circulates in said membrane reactor at a speed of 3 to 15 m/h.

Such an implementation creates an environment in the reactor favorable to putting the adsorbent material and the particulate polymer material in suspension. Thus, the turbulence effect induced by the movement of the beads of the particulate polymer material prevents or at any rate greatly limits the phenomenon of abrasion of the membranes by the adsorbent powdery material. This movement of turbulence also enables the smooth detachment of the matter that might adhere to the filtration materials and that might clog the pores.

Advantageously, said membrane is chosen from the group of membranes constituted by submerged microfiltration, ultrafiltration and nanofiltration membranes.

In one particularly advantageous embodiment, the method according to the invention further comprises a step for injecting ozone into the water to be treated, said step for injecting ozone being possibly carried out upstream to said membrane reactor or in said membrane reactor.

Such a step improves the efficiency of treatment of the water by oxidizing a part of the molecules to be eliminated. This step especially improves the elimination of endocrine disruptors and medicinal residues. The ozonation furthermore fragments the large-sized organic molecules into smaller molecules, thus facilitating their adsorption and their subsequent elimination. Ozonation finally eliminates certain algal toxins and malodorous molecules.

Preferably, the method of the invention does not include any injection of coagulant and/or flocculent in said membrane reactor. Indeed, certain methods for treating water include steps of coagulation-flocculation to improve the efficiency of the method by eliminating the organic macromolecules in water for example and to enable the separation of powdery material from the treated water. However, these methods imply planning for a separator to separate the adsorbent material and the flocculation and coagulation reagents from the treated water. However, a part of the adsorbent powdery material is lost during such separation. This implies re-injecting fresh adsorbent material and increasing costs of treating water. In addition, these separators as well as the coagulation/flocculation tanks etc represent a considerable investment in civil engineering works and maintenance which contributes in equivalent measure to increasing the costs of water treatment. The invention makes it possible to avoid implementing coagulation and/or flocculation since it uses membranes. This is particularly appreciable when, for reasons related to the regulations, the use of flocculants and/or coagulants is not permitted. The size and cost of the plants according to the invention is thereby reduced. The losses in adsorbent reagent and therefore the consumption of this adsorbent reagent are also reduced.

An object of the invention is also a plant for implementing the method comprising at least one membrane reactor integrating at least one membrane filtration unit comprising at least one filtration membrane;
means for conveying water to be treated into said at least one membrane reactor;
means for injecting an adsorbent powdery material into said water to be treated;
means for recirculating at least a part of the content of said membrane reactor;
a particulate polymer material constituted by particles having an average diameter of 1 mm to 5 mm, and a density of 1.05 to 1.5 present in said membrane reactor in a concentration of 1 to 10 g/L;
means for retaining said particulate polymer material inside said membrane reactor;
means for stirring said content of said membrane reactor;
means for discharging water coming from said membrane filtration unit;
means for draining the mixture of water and adsorbent powdery material and excess sludges coming from said membrane reactor.

Thus, the plant according to the invention is compact as compared with plants comprising the steps of coagulation/flocculation because it comprises neither a coagulation-flocculation tank nor means for injecting coagulation and flocculation reagents not any separator such as a decanter. It is also more compact as compared with plants implementing a non-membrane filtration unit.

Advantageously, said particulate polymer material is chosen from the group comprising polypropylene beads, carbonated polypropylene beads, hollow polypropylene beads filled with minerals, polycarbonate beads, polyurethane beads, polymethylmethacrylate beads, polybutylene terephthalate beads, polyoxymethylene beads, polyethylene beads, and polyvinyl chloride beads.

According to one valuable variant, said membrane reactor comprises:
a zone of pre-contact of said water with said adsorbent powdery material into which there lead said means for conveying water to be treated, said means for injecting said adsorbent powdery material leading into said zone for putting into contact or leading into said means for conveying water to be treated; and
a membrane filtration zone;
said pre-contact zone and said filtration zone being physically separated from each other, said plant comprising means for conveying the content of said pre-contact zone into said filtration zone.

This embodiment is favorable to the adsorption of the pollutants on the adsorbent powdery material by increasing the residence time of the water to be treated with this material. Such a variant enables the simple and satisfactory reduction of the pollution dissolved in the water to be treated.

Preferably, said means for stirring the content of said membrane reactor comprise at least one air injection bar to be placed inside said membrane reactor, advantageously in its lower part or in said pre-contact zone.

Alternatively or complementarily, said means for stirring the content of said membrane reactor comprises said means of recirculation of at least one part of the content of said membrane reactor.

It is also possible to provide for a stirrer taking the form of means for stirring the contents of the reactor, provided in the pre-contact zone of said membrane reactor.

Either of these embodiments or a combination of these two embodiments makes it possible to give rise to stirring so as to maintain the adsorbent powdery material as well as the particulate polymer material in suspension in the membrane reactor. This stirring makes it possible firstly to homogenize the distribution of said adsorbent powdery materials and particulate polymer materials within the reactor and secondly to prevent the adsorbent material from adhering to the filtration membranes. The quality of the water is therefore better and more reproducible. The phenomena of abrasion and clogging of the membranes are also reduced or even prevented.

Advantageously, the plant according to the invention comprises means for injecting ozone into said water to be treated.

The means for injecting ozone can be positioned at the means for leading in water to be treated into a pre-contact reactor or in the membrane reactor itself. The injection of ozone can also be done upstream to the injection of adsorbent powdery material into the water to be treated. More specifically, an injection of ozone, preliminarily to the step for placing in contact with the adsorbent material, fragments the macromolecules and partly oxidizes the pollutants dissolved in the water before adsorption. Thus, adsorption on the adsorbent powdery material is facilitated and the quality of the treated water is improved.

5. LIST OF FIGURES

Other features and advantages of the invention shall appear more clearly from the following description of two preferred embodiments given by way of simple, illustrative and non-exhaustive examples and from the appended drawings, of which.

6. DESCRIPTION OF THE EMBODIMENTS OF THE INVENTION 6.1. Reminder of the Principle of the Invention The general principle of the invention is based on a technique of water treatment combining adsorption on an adsorbent powdery material and filtration on membranes according to which a particulate polymer material is added into the membrane reactor in order to limit the abrasion of the membranes.

6.2. Description of a First Embodiment

Figure 1:
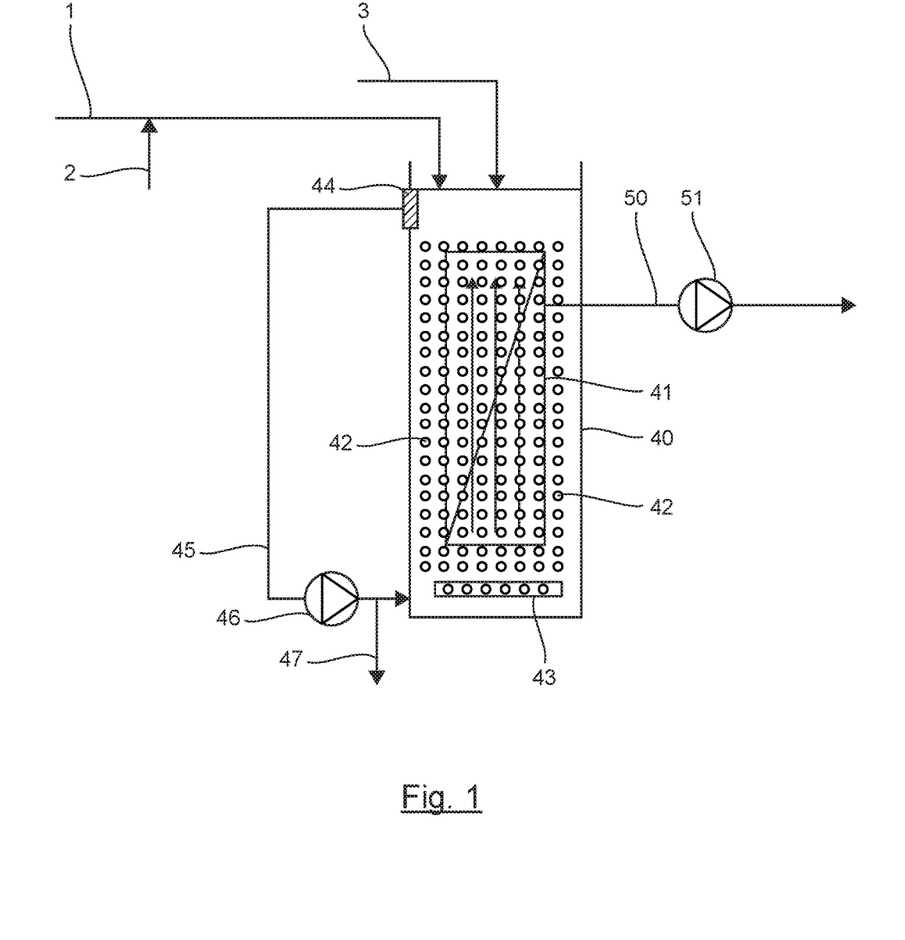
FIG. 1 schematically illustrates a first embodiment of a plant for implementing the method according to the invention.

Referring to FIG. 1, we present a first embodiment of a plant according to the invention for implementing the method according to the invention.

In this embodiment, the plant according to the invention comprises a conduit for leading in water 1 opening into a reactor for treating water 40 so as to introduce water to be treated into this reactor.

Means for injecting ozone 2, namely an injector, are used to inject ozone into the water to be treated in order to make it undergo a step of ozonation. This step of ozonation oxidizes all or part of the pollutants contained in the water to be treated. It also fragments the macromolecules facilitating their adsorption on an adsorbent powdery material. In this embodiment, the injection of ozone is carried out at the water lead-in pipe 1. It could however in other embodiments be done at the level of the membrane reactor.

The reactor 40 houses a membrane filtration module 41. This membrane filtration module 41 consists of submerged membranes, in this case microfiltration membranes, but in other embodiments they could be ultrafiltration or nanofiltration membranes made at least partly out of an organic material. The dimensions of the reactor 40 are such that there is little space between the internal walls of the reactor 40 and the external outline of the filtration module 41.

Means for injecting particulate adsorbent material 3, such as for example an injector, lead into the reactor 40. Preferably, this particulate adsorbent material is PAC and is distributed in the reactor 40 in a determined quantity in such a way that the PAC concentration of the water in the membrane reactor 40 ranges from 0.1 g/L to 5 g/L.

The reactor 40 contains a particulate polymer material in the form of beads 42. The beads 42 have a smooth surface. The beads are suited to implementing a method according to the invention having an average diameter of 1 mm to 5 mm and a density of 1.05 to 1.5. They can preferably be of a particulate polymer material chosen from the group comprising polypropylene beads, carbonated polypropylene beads, hollow polypropylene beads filled with minerals, polycarbonate beads, polyurethane beads, polymethylmethacrylate beads, polybutylene terephthalate beads, polyoxymethylene beads, polyethylene beads and polyvinyl chloride beads.

Preferably, the quantity of beads is chosen in such a way that the concentration of beads 42 in the water in the reactor 40 is about 8 g/L.

The plant comprises means for injecting air into the reactor 40. These means of injection herein comprise an injection bar 43 situated in the lower part of the reactor 40 beneath the membrane filtration module, connected to an air lead-in system (not shown). The injected air enables the PAC to be put into suspension in the water to be treated so that its distribution is essentially uniform within the membrane reactor and so as to optimize its pollutant adsorption capacity. The injected air also enables the stirring of the beads 42 in the reactor. The beads 42 then form a protective shield on the surface of the membranes making it possible to:

limit wear and tear in the membranes from abrasion by preventing the PAC from rubbing against the surface of the membranes;

smoothly detaching the matter that might be deposited on the surface of the membranes without impairing these membranes because of the turbulence that the material generates in the reactor.

The water mixed with PAC passes through the filtration module in order to separate the treated water from the PAC. The treated water is thus discharged by the pipe 50 on which a pump 51 is situated.

The plant also comprises a recirculation loop 45 on which there is a recirculation pump 46 and a drain unit 47. The drain unit 47 discharges the excess sludge. The inlet of the recirculation pipe 45 opens into the upper part of the reactor 40 whereas its outlet opens into the lower part of this reactor. This loop 45 enables the recirculation, at least partly, of the mixture of water and PAC contained within the reactor, and this recirculation generates a stirring in the reactor.

A retaining screen 44, placed between the reactor 40 and the inlet of the recirculation loop 45, retains the beads 42 in the reactor 40.

In this embodiment, the stirring within the reactor is kept going continuously.

6.3. Description of a Second Embodiment

Figure 2:
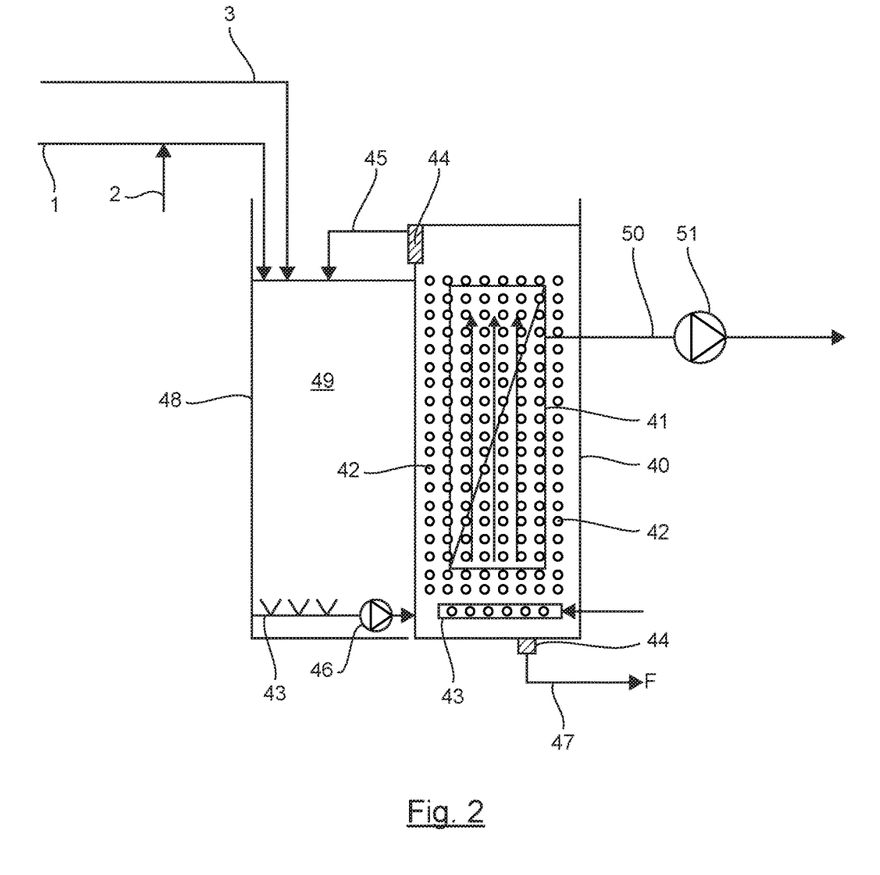
FIG. 2 schematically illustrates a second embodiment of a plant for implementing the method according to the invention.

A second embodiment of a plant for implementing a method according to the invention is presented in FIG. 2. In this embodiment, the elements having the same function as in the embodiment described with reference to FIG. 1 bear the same references.

In this second embodiment, the plant comprises a membrane reactor 40 sub-divided into a pre-contact zone 48 and a filtration zone 49.

The pre-contact zone 48 herein comprises a pre-contact tank 48 and the filtration zone herein comprises a filtration tank 49, the pre-contact tank being placed upstream to the filtration tank.

This pre-contact tank 48 houses means for injecting air such as for example an injection bar 43, at the lower part of this tank. This injection bar is connected to an air lead-in network (not shown). The pre-contact tank 48 also houses a pump 46, which enables water to circulate from the tank 48 to the filtration tank 49. The tank 48 increases the time of contact between the water to be treated and the adsorbent material. This embodiment is particularly useful for treating charged water in order to allow more time for the compounds to be adsorbed by the PAC and thus increase the efficiency of the water treatment method.

It will be noted that, in other embodiments, the stirring of the contents of the tank could be done through one or more stirrers provided in the pre-contact tank 48.

In this embodiment, the drain unit 47, enabling the discharging of the mixture of water and adsorbent material and the excess sludge, is situated in the lower part of the filtration tank 49. The drain unit 47 is preceded by a retaining screen 44 used to retain the beads within the filtration tank 49.

The plant according to this second embodiment also comprises a recirculation loop that increases the average residence time of the mixture of water and adsorbent material in the plant and plays a part in generating a stirring both in the pre-contact tank and in the filtration tank. This recirculation loop comprises:

a pipe 45 for recirculating at least a part of the content of the filtration tank 49 into the pre-contact tank 48, and
the pump 46 used to convey the content of the pre-contact tank 48 into the filtration tank 49.

Just as in the case of the first embodiment, the injection of ozone 3 is done in the water lead-in pipe 1. However, in other embodiments, it is possible to consider these means for injecting ozone into the pre-contact tank 48 or at the filtration tank 49.

In this embodiment, the stirring inside the reactor is done continuously so that the de-clogging of the membranes is continuous.

6.4. Variants

In the two embodiments described here above, the content of the reactor is put into motion because of an injection of air into the reactor or into the filtration zone of the reactor and because of a recirculation of the content of the reactor or of the filtration zone. In variants, the content of the reactor can be put into motion only by injecting air or only by recirculation.

In the second embodiment, the reactor 40 is sub-divided into a pre-contact tank 48 and a filtration zone 49 by means of a separating wall. However, in another embodiment, not shown, the plant can include a pre-contact tank distinct from the water treatment reactor housing the membrane filtration means. In this other embodiment, the pre-contact tank is placed upstream to the water treatment reactor. A pump is used to send the mixture of water to be treated and PAC from the pre-contact tank to the water treatment tank by means of a pipe. In this variant, the means for injecting PAC and leading in water to be treated also open into the pre-contact tank. As in the second embodiment, the stirring of the pre-contact tank can be done by injection of air and/or recirculation of the mixture of water to be treated and PAC from the reactor for treating water to the pre-contact tank.

7. TRIALS

A plant for treating water with a view to making it drinkable, comprising a membrane reactor integrating microfiltration membranes, was implemented with PAC injection, the membranes being used to separate the PAC from the water and to reduce its content in microorganisms.

Measurements of the Log Removal Value (LRV) parameter expressing the reduction of microorganisms were made at the start of the trial and at the end of a month and a half according to two distinct methods (on cultures and by RT-PCR). The results of these measurements, shown in the table 1 here below, express a highly significant diminishing of this reduction. In practice, the LRV observed at the end of a month and a half is 5 or 7 times smaller depending on the method of measurement. This demonstrates the diminishing of the efficiency of the membranes resulting from their abrasion by PAC.

TABLE 1

| Type of analysis | Initial LRV | LRV after 1.5 months |
| --- | --- | --- |
| Culture | 4.1 | 0.6 |
| RT-PCT | 3.8 | 0.8 |

A plant of the same type was implemented to treat wastewater with a view to its cleansing but in providing for the injection into the membrane reactor of beads made of polymer material, namely carbonated polypropylene having a diameter of 4 mm and a density of 1.05. No washing of the membranes using chemical products was made.

Figure 3:
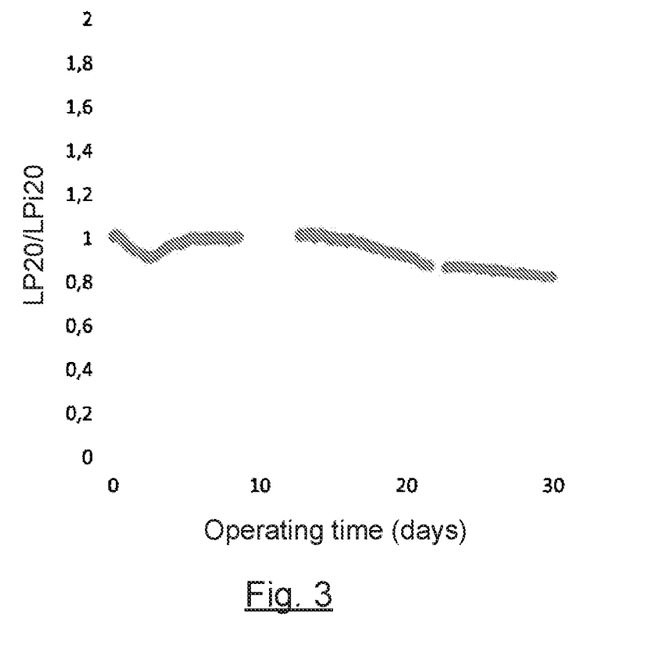
FIG. 3 is a graph showing the progress of the permeability of the microfiltration membranes of a plant of the type shown in FIG. 1 implemented according to the invention.

After 1.5 months of operation, the LRV criterion was measured at 3.3, namely close to its initial value. This LRV of 3.3 corresponds to a reduction in microorganisms close to the quantification threshold. This result attests to the major minimizing of the phenomenon of abrasion of membranes observed earlier. Referring to FIG. 3, the relative permeability of the membranes, which corresponds to the ratio of permeability measured during the time LP20 to the permeability measured at the start of the trials LPi20, was only slightly diminished despite the fact that no chemical washing of the membranes was made. The reduction of the COD (chemical oxygen demand) and of the TOC (total organic carbon) for its part was stable throughout the trial.

8. CONCLUSIONS

Thus, the method according to the invention enables the production of treated water of equivalent quality, or if not of greater quality, than that produced by the implementing of existing methods. The method according to the invention resolves a problem frequently encountered during the use of filtration membranes, namely premature mechanical wear and tear of the membranes due to the abrasive nature of the adsorbent material, possibly combined with the action of air injected into the reactor. Indeed, far from aggravating the problem of abrasion of membranes as it was natural to imagine, the addition of a particulate polymer material, that is inert relatively to the membranes, protects the surface of these membranes. More specifically, the stirring of the reactor makes it possible to place both the adsorbent powdery material and the particulate polymer material in suspension. Thus, the rubbing of the adsorbent material against the membranes is limited: the method according to the invention therefore effectively reduces the phenomenon of abrasion leading to mechanical wear and tear of the membranes.

In addition, the particles forming the particulate polymer material, by their motion in the water, put into a state of turbulence in the medium, prevent the adsorbent powdery material from adhering to the filtration membranes and obstructing the pores of these membranes. In so doing, the method according to the invention also plays a role in limiting the clogging of the membranes.

The invention claimed is:

1. A method for treating water comprising:
   directing the water into a membrane reactor having a submerged filtration membrane constituted by organic material and contacting the water in the membrane reactor with powdered activated carbon having a concentration of 0.1 to 5.0 g/L;
   filtering the water in the membrane reactor with the submerged filtration membrane;
   limiting the abrasion of the submerged membrane by the powdered activated carbon by:
   i. injecting polymer beads into the membrane reactor
   ii. injecting air into the membrane reactor;
   iii. utilizing the injected air to stir the water, polymer beads and powdered activated carbon and homogenize the powdered activated carbon and polymer beads and causing the polymer beads and the turbulence induced by the polymer beads to form a protective shield around the membrane protecting the membrane and limiting the accumulation of powdered activated carbon on the membrane and limiting the abrading of the membrane that results from the accumulation of powdered activated carbon on the membrane; and
   iv. wherein the polymer beads have a concentration of 1 g/L to 10 g/L and have an average diameter of 1 mm to 5 mm and a density of 1.05 to 1.5.

2. The method of claim 1 wherein the water, powdered activated carbon and the polymeric beads form a mixture and wherein the method includes stirring the mixture with sequenced or non-sequenced injection of air into the mixture.

3. The method of claim 1 wherein the water, powdered activated carbon and the polymeric beads constitute a mixture and wherein the method includes stirring the mixture by recirculating at least a part of the mixture in the membrane reactor.

4. The method of claim 1 wherein said the polymeric beads are chosen from the group consisting of polypropylene beads, carbonated polypropylene beads, hollow polypropylene beads filled with minerals, polycarbonate beads, polyurethane beads, polymethylmethacrylate beads, polybutylene terephtalate beads, polyoxymethylene beads, polyethylene beads, and polyvinyl chloride beads.

5. The method of claim 1 including circulating the water in the membrane reactor through a recirculation loop at a speed of 3 to 15 m/h.

6. The method of claim 1 wherein said submerged filtration membrane is chosen from the group including nanofiltration membranes, ultrafiltration membranes and microfiltration membranes.

7. The method of claim 1 further including injecting ozone into the water to be treated at a point upstream of the membrane reactor or in said membrane reactor.

* * * * *